United States Patent [19]

Gutjahr

[11] 4,073,063
[45] Feb. 14, 1978

[54] METHOD AND DEVICE FOR DRYING SURFACE TREATED, ESPECIALLY VARNISHED OBJECTS

[75] Inventor: Rolf Gutjahr, Stuttgart, Germany

[73] Assignee: Firma Otto Durr, Stuttgart, Germany

[21] Appl. No.: 639,003

[22] Filed: Dec. 8, 1975

[30] Foreign Application Priority Data

Aug. 19, 1975 Germany .............................. 2536935

[51] Int. Cl.$^2$ ............................................... F26B 3/02
[52] U.S. Cl. ........................................... 34/32; 34/72
[58] Field of Search .............................. 34/27, 32, 72

[56] References Cited

U.S. PATENT DOCUMENTS

| | | | |
|---|---|---|---|
| 3,601,900 | 8/1971 | Erisman | 34/32 |
| 3,757,427 | 9/1973 | Wilkinson | 34/32 |
| 3,909,953 | 10/1975 | Hemsath et al. | 34/32 |

*Primary Examiner*—Paul E. Maslousky
*Attorney, Agent, or Firm*—Michael J. Striker

[57] ABSTRACT

A method of drying surface treated objects having a protective layer deposited thereupon. The drying is performed in a closed drying space by a heated gaseous medium. The heat content of the effluent gaseous medium discharged from the closed space is utilized for further drying either directly by its introduction into the drying space or indirectly by contacting it with a fresh gaseous medium to cause heat exchange therewith and then introducing into the drying space the thus heated fresh gaseous medium. Prior to utilization of the heat content of the effluent discharged gaseous medium, the same may be purified and a portion thereof may be released into the atmosphere.

A device performing this method.

5 Claims, 2 Drawing Figures

METHOD AND DEVICE FOR DRYING SURFACE TREATED, ESPECIALLY VARNISHED OBJECTS

BACKGROUND OF THE INVENTION

The invention relates to a method of drying objects having been surface treated for depositing thereupon a protective layer such as that of a varnish, paint or another coating material, or for providing thereon such a protective layer otherwise, especially in a chemical way.

The method comprises the steps of placing said objects into a closed space, contacting them inside said space with a stream of a heated gaseous medium, such as for instance hot air, which gaseous medium will be referred to hereinafter as gas only. By the gas heat, evaporation is provoked from the objects of the moisture their surface layer contains. Thus especially solvents and other ingredients of the varnish, paint or coating get vaporized. Then, the drying gas is discharged from said closed space and the heat content thereof is reutilized for further drying. This then may be done by reintroducing said discharged gas into the drying space. However, it also is possible to thus reutilize a portion only of this discharged gas and to release the other portion, together with the evaporates and/or products of chemical processes occurred in said closed space into the ambient atmosphere.

It has been known heretofore to expose the so surface treated objects to a hot gas in a closed space, such as a drying chamber, for causing an accelerated drying of such objects by evaporating from their surface the moisture present in the layers formed thereupon by for instance varnishing, painting and other coating processing and for having the products of chemical processes occurring in the closed space admixed with the hot gas, then exhausting the gas charged with the vapors and/or chemical gaseous products and releasing this so-charged gas into the surrounding atmosphere. There also have been known various devices designed for carrying out such methods, i.e. devices having a closed drying chamber equipped with heated gas supply, exhaust and release conduits.

The known methods have the disadvantages that no efficient provision is made for cleansing the effluent gas leaving the drying space before releasing it into the atmosphere, in order to separate from this released effluent gas harmful and often toxic substances which are hazardous for human health, in particular that of the process operators and all persons arriving to or present in the shop or place where the drying process is performed.

SUMMARY OF THE INVENTION

The invention relates to an improved method of drying surface treated objects, more particularly, varnished, painted, coated and otherwise, especially chemically, treated products. This improved method provides for locating these objects in a closed space, introducing into this space a heated gas, such as hot air, and drying the objects by contact with this heated gas. The gas streaming past and around said objects provokes evaporation therefrom of the moisture they contain in the layers deposited on their surfaces in said various surface treatments. The gas utilized for drying gets charged with evaporates and with gaseous products of chemical reactions which occurred on the surface of the objects. After this drying operation, the heat content of this utilized gas, being discharged from the closed space and containing these evapoates and gaseous chemicals, is utilized in a further drying operation either directly or after being purified. Also only a portion thereof still hot enough may be thus utilized and the other portion thereof may be released to the outside, i.e. into the atmosphere. The heat content of the discharged effluent gas also may be utilized by contacting it with a fresh gaseous medium led to be supplied into the drying space in order to heat this fresh gaseous medium by heat exchange. The thus heated fresh gaseous medium is supplied into the closed space where the drying takes place and the thus utilized effluent gas is released into the atmosphere.

This method also provides for purifying said effluent gas prior to its release into the atmosphere. This step substantially mitigates the danger whereto the ambient atmosphere of the closed drying space is exposed when all the effluent gas is immediately released, without being purified, into the atmosphere. The risk of releasing this effluent gas into the atmosphere may be very high. This gas is saturated with noxious substances evaporated from the objects and which may be of a highly harmful character. These substances may be for instance gasified solvents and other components used in varnishes, paints or coating materials, or chemical products, all of them possibly being of irritating, perilous and even toxic character.

These substances may affect the processing workers and infest the atmosphere. A reduction of these substances in the released effluent gas substantially improves the working conditions and abates the environmental risks.

The invention also relates to a device designed for performing the method of the present invention.

Accordingly, it is an object of the present invention to improve the method of drying surface treated objects.

More particularly, it is an object of the invention to lower the cost of the drying by reutilizing the heat content of the gas discharged from the closed drying space.

It is another object of the invention to provide for purification of the effluent gas leaving the drying space and being released into the atmosphere.

It is a concommitant object of the invention to obviate any hazards for human health by separating from the effluent gas leaving the drying space and being released into the atmosphere, so far as possible, all obnoxious substances.

It is a further object of the present invention to economize the drying process by reutilizing the heat content of at least a portion of the purified heated gas by its reintroduction into the drying space for drying the objects.

Still another object of the invention is to economize the drying process by utilizing the heat content of at least a portion of the purified heated gas by its contact with a fresh gaseous medium for heating it by heat exchange before it is introduced into the drying chamber.

Yet another object of the present invention is to prevent at least partially the contamination of the surrounding atmosphere by the harmful evapoates and chemical products admixed with the effluent gas by releasing into the atmosphere only a portion of this gas after its purification.

An additional object of the present invention is to reemploy the heat content of a portion of the purified effluent gas whose temperature has been substantially increased in the purifying step by burning off the inflammable substances contained in the effluent gas for elevating the temperature of the fresh gaseous medium by heat exchange with this thus heated effluent gas to a degree sufficient to cause drying of the objects and evaporating therefrom their surface moisture.

Accordingly, the inventive concept is more specifically concerned with a method wherein the effluent gas leaving the closed space wherein the drying has taken place is first purified to get, so far as possible, rid of the harmful substances it entrains from said space, whereafter this gas is divided into two portions, only one of which is released into the atmosphere, while the other portion is reused in the drying operation. This method brings about at least two advantages, namely a decrease in the released effluent gas of the human health attacking substances, and an economization of the drying process by exploiting therein the heat enthalpy of the other portion of the effluent gas.

In order to attain a drying balance, i.e. to equalize the hot and the cold gas temperatures before supplying the latter into the drying space, the amount of the heated and purified effluent gas to be reused is generally limited. Usually, it will be possible to exploit in the drying space at least 50% of the heat content which otherwise would remain uselss and lost would the entirety of the effluent gas be directly released into the surrounding atmosphere. This is especially efficient where the purification has been made by burning off from the effluent gas the inflammable evaporates and chemicals whereby the temperature of the gas is substantially increased.

The invention also provides a device designed for performing the method of the present invention.

In accordance with the above indicated objects and others which will become apparent hereinafter, the device of the present invention comprises, briefly stated, a drying chamber connected to conduits supplying thereinto a heated gaseous medium and at least one conduit for escape of the effluent gas which conduit opens into a purifying unit. This unit opens into a discharge duct releasing a portion of the purified effluent gas into the atmosphere and into a conduit connected for leading the other portion of the purified effluent gas either directly to the drying chamber or to a heat exchanger wherein the flow of a fresh gaseous medium is heated by heat exchange with this portion of the purified effluent gas and then directed into the drying chamber, while this portion of the effluent gas is released into the atmosphere.

In one of the currently preferred embodiments, the conduit directing the purified gas to the drying chamber is branched and has connected to one and the other of its branches, respectively, a mouth provided at, and opening into, the one and the other end of the drying chamber, in order to fill the latter with the hot purified gas. In this preferred embodiment, a fan is installed in the conduit of the purified effluent gas to the drying chamber to accelerate the flow of this gas and thereby its circulation through the drying chamber.

In a further embodiment, a heat exchanger is installed in the conduit wherethrough the purified effluent gas flows from the purifying unit. This heat exchanger has two adjacent chambers separated from one another by a partition wall. The purified effluent gas flows through one of these chambers, while a fresh gaseous medium flows through the other of these chambers. In this heat exchanger, the purified effluent gas heats by heat exchange the fresh gaseous medium. From the heat exchanger, the purified effluent gas is released to the atmosphere, while the thus heated gaseous medium is led into the drying chamber.

In this embodiment also flap members may be provided for regulating the flow of the purified effluent gas either into the conduit releasing it into the atmosphere or into the conduit directing a portion thereof to said heat exchanger.

The novel features which are considered as characteristic for the present invention are set forth, in particular, in the appended claims. the invention itself, however, both as its construction and its method of operation are concerned, together with additional objects and advantages thereof, will be best understood from the following description of specific embodiments when read in connection with the accompanying drawings.

BRIEF DESCRIPTION OF THE DRAWINGS

Referring now to the drawings, it may be seen that.

DETAILED DESCRIPTION

Figure 1:
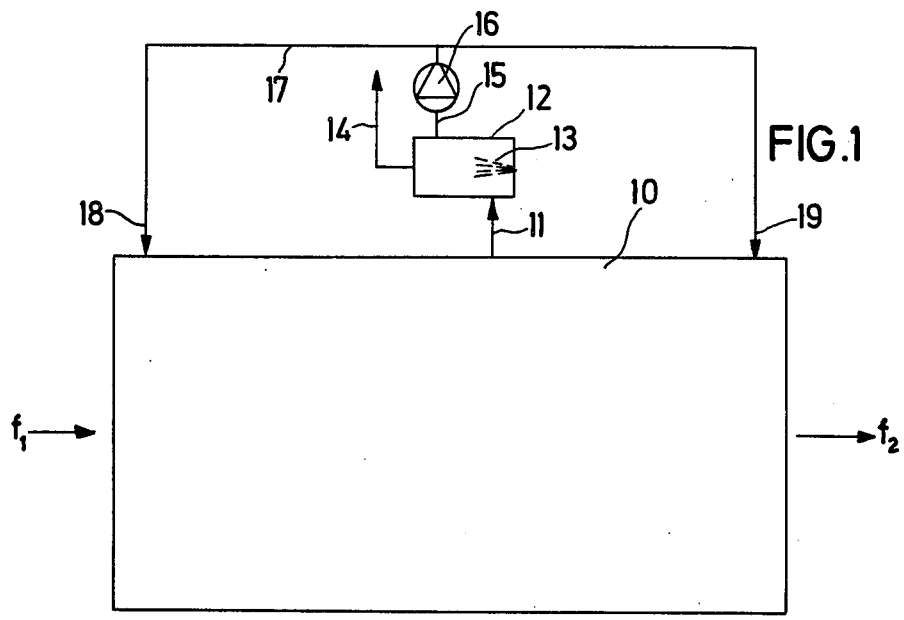
FIG. 1 shows an embodiment of the present invention wherein the purified effluent gas is led directly into the drying chamber.
Figure 2:
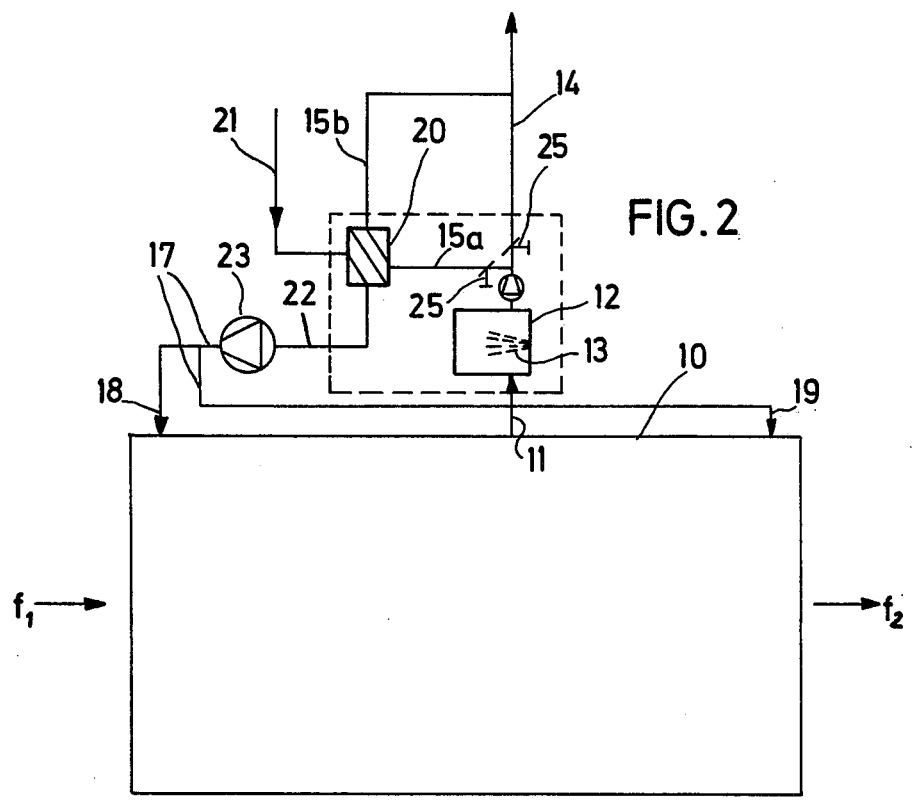
FIG. 2 shows another embodiment of the present invention wherein the purified effluent gas is led into the drying chamber across a heat exchanger.

In FIGS. 1 and 2, a drying chamber is illustrated with arrows $f_1$ and $f_2$ indicating, respectively, the directions in which the objects to be dried enter and leave the drying chamber. The suface of said objects may have been surface treated by for instance varnishing, painting, coating, or some other, for instance chemical, process. In the drying chamber 10, these objects are dried by exposure to the impact of a heated gas, such as hot air, forced to stream through the chamber, to superificially dry the surfaces of the objects thus causing evaporation therefrom of the excess moisture and entraining said moisture and carrying it out of the drying chamber. Because of this, the effluent gas leaving the chamber 10 contains a certain amount of gasified harmful substances usually present in the varnishes, paints, coating materials and the like.

FIG. 1 shows a duct 11 communicating with the drying chamber and opening into a purifying unit 12. This unit may be of any selected nature, such as for instance one including a burner 13. Herein, the spoiling components of the effluent gas are, so far as possible, eliminated from the gas, for instance by being burned off; thus, the effluent gas is partially purified. The purifying unit 12 is provided with two outputs. To one of these outputs, a conduit 14 is connected opening to the outside, e.g. through a chimney. To the other output of the purifying unit 12, another conduit 15 is attached which opens onto a fan 16 wherefrom two branches of a duct 17 are led, each of which branches opens by a mouth (18,19) at one end of the drying chamber.

The embodiment displayed by FIG. 2 is a construction sightly different from that shown in FIG. 1. In this embodiment, the purifying unit 12 has connected to its output a conduit 15a leading to a heat exchanger 20. This heat exchanger is connected at its inlet to said conduit 15a and also to a fresh gas supplying duct 21. This heat exchnger is subdivided into two adjacent chambers separated by a partition wall. Herein, the incoming fresh gas, passing through one of said chambers, is heated by heat exchange across said partition wall with the still hot portion of the purified effluent gas passing through the other of the chambers and released then to the atmosphere, while the fresh gas, being so heated, is led into the drying chamber; FIG. 2 further shows a conduit 15b connecting the chamber of the heat exchanger 20 wherethrough the purified effluent gas flows with the gas releasing conduit 14. A heated fresh gas supplying conduit 22 is established at the output of the heat exchanger. This heated fresh gas supplying conduit 22 communicates across a fan 23 with the gas supply duct 17 having two branches opening into the drying chamber 10 by two mouths 18 and 19.

In this embodiment, as FIG. 2 also shows, there may be provided between the purifying unit 12 and the conduits 14 and 15a elements, such as for instance flap means 25,25 and the like, operable to limit and/or close the passage of the purified effluent gas, as need may be, to either the heat exchanger 20 or the atmosphere through the gas release duct 14. These elements may be arranged to be either operable manually or to operate automatically in response to the working conditions, for instance the temperature, in the drying chamber or at its entrance or exit.

While the invention has been illustrated and described as embodied in FIGS. 1 and 2, it is not intended to be limited to the details shown, since various modifications and structural changes may be made without departing in any way from the spirit of the present invention.

It will be understood that each of the elements described above, or two or more together, may also find a useful application in other types of drying and other devices differing from the types described above.

Without further analysis, the foregoing will so fully reveal the gist of the present invention that others can, by applying current knowledge, readily adapt it for various applications, without omitting features that, from the standpoint of prior art, fairly constitute essential characteristics of the generic or specific aspects of this invention, and, therefore, such adaptations should, and are intended to be comprehended within the meaning and range of equivalence of the following claims.

What is claimed as new and desired to be protected by Letters Patent is set forth in the appended claims:

1. A device for drying solvent-based coatings on objects, comprising a drying housing having an upper wall, a lower wall and spaced end walls intermediate said upper and lower walls, each of said end walls having openings for permitting objects to be passed through said housing, all of said walls together bounding a drying chamber adapted to contain a gaseous atmosphere for drying solvent-based coatings on objects passing through said openings with concomitant charging of the gaseous atmosphere with contaminant solvent-based vapors; means for withdrawing a portion of the contaminant-entrained atmosphere from said drying housing, including an exhaust conduit located on said upper wall substantially centrally of said end walls and being in communication with said drying chamber; means for generating a heated gaseous medium, including heating means in communication with said exhaust conduit and operative for heating the contaminated withdrawn portion to a temperature sufficient to substantially incinerate the contaminants entrained therein to thereby generate a heated purified gas; means for discharging the heated purified gas to the ambient atmosphere, including a discharge conduit in communication with said heating means and with the ambient atmosphere; and means for admitting the heated gaseous medium into said drying chamber, including a two-branch conduit having an inlet in communication with said generating means and a pair of outlets in communication with said drying chamber and being located on said upper wall, each outlet of said two-branch conduit being proximately located relative to a respective end wall of said drying housing and being spaced on opposite sides of said exhaust conduit at substantially the same distance from the latter, said admitting means further including means in said two-branch conduit for circulating the heated gaseous medium from said generating means through said two-branch conduit to be expelled from the respective outlets of the latter as separate streams which pass through said drying chamber along respective paths of substantially the same length towards said exhaust conduit.

2. A device as defined in claim 1, wherein said heating means constitutes a burner in communication with said exhaust outlet and operative for heating the contaminated withdrawn portion to a temperature sufficient to substantially incinerate the contaminants entrained therein to thereby purify the withdrawn portion; and wherein both said discharge conduit and said inlet of said two-branch conduit are in communication with said burner.

3. A device as defined in claim 1, wherein said generating means includes a heat exchanger having two sections in heat-exchanging relationship with each other, and wherein said discharge conduit is in communication with one of said sections for permitting passage of the heated purified gas through said one section prior to discharge to the ambient atmosphere; and further comprising means for conveying a gaseous medium through the other of said sections so as to generate said heated gaseous medium by heat exchange with the heated purified gas passing through said one section.

4. A device as defined in claim 3; and further comprising means in said discharge conduit for regulating the flow of the heated purified gas away from the heating means, including a first valve located intermediate said heating means and said one section of said heat exchanger, and a second valve located intermediate said heating means and the ambient atmosphere.

5. A method of drying solvent-based coatings on objects, comprising the steps of advancing objects through a drying chamber adapted to contain a gaseous atmosphere for drying solvent-based coatings on the objects with concomitant charging of the gaseous atmosphere with contaminant solvent-based vapors; withdrawing a portion of the contaminant-entrained atmosphere from the drying chamber; generating a heated gaseous medium, including the stop of heating the contaminated withdrawn portion to a temperature sufficient to substantially incinerate the contaminants entrained therein to thereby generate a heated purified gas; discharging the heated purified gas to the ambient atmosphere; and admitting the heated gaseous medium into the drying chamber, including the step of dividing the heated gaseous medium into separate streams, the step of conveying the separate streams to opposite end regions of the drying chamber, and the step of circulating the separate streams through the drying chamber along respective paths of substantially the same length prior to withdrawal of the streams from the drying chamber.

* * * * *